Figure 1:
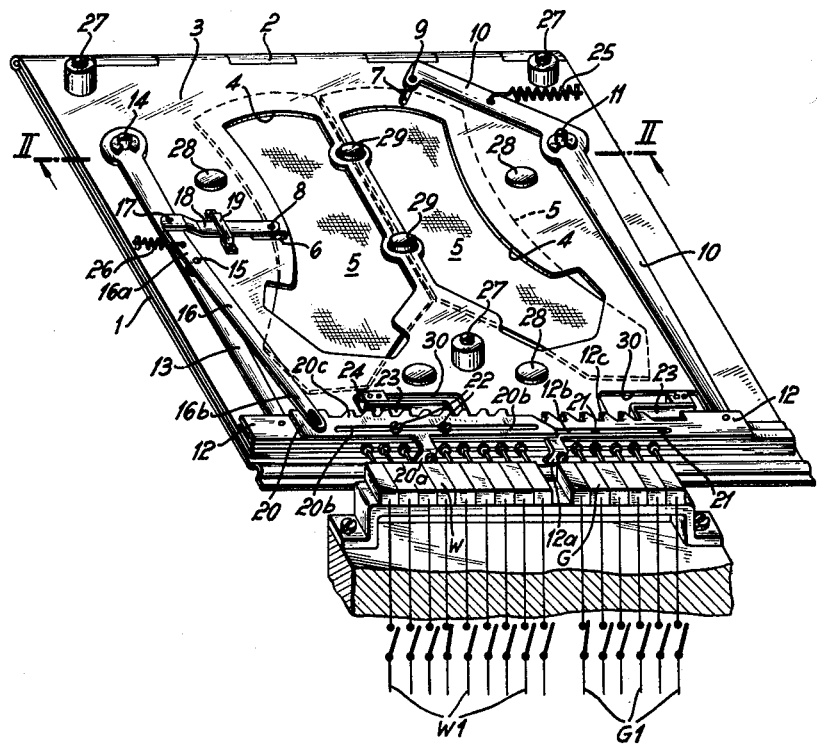

Nov. 10, 1964

H. ADAM ETAL 3,156,203

WORK BLANK SUPPORT, PARTICULARLY SEWING
MATERIAL SUPPORT FOR AUTOMATIC DEVICE

Filed May 2, 1962

INVENTORS:
Hans ADAM
Hans ORTH
Emil CLAUSS

BY *Robert H. Jacob*

AGT.

3,156,203
WORK BLANK SUPPORT, PARTICULARLY SEWING MATERIAL SUPPORT FOR AUTOMATIC DEVICE
Hans Adam, Kaiserslautern, Hans Orth, Alsenborn, and Emil Clauss, Kaiserslautern, Germany, assignors to G. M. Pfaff AG, Kaiserslautern, Pfalz, Germany
Filed May 2, 1962, Ser. No. 191,948
Claims priority, application Germany, May 6, 1961, P 27,114
11 Claims. (Cl. 112—2)

The invention relates to a work blank support, particularly a sewing material support for an automatic device provided with operating switches for selectively connecting work performing devices.

In automatic devices which serve for working on different work blanks in sequence and in accordance with factors which vary from one case to the other, it is necessary that a corresponding number of optionally operable work performing devices are associated with these factors.

The variable factors may be of different types, as, for example, the condition of the surface or different appliques, but may also include such factors that cannot be mechanically determined, as for example, different colors.

In the present case it is intended to deal with the variables of those factors which probably occur most often; namely, those of the variable magnitudes of width and length, i.e. the variability of a work blank in two directions of coordinates.

For example, automatic machines which serve for working in sequence on work blanks of different sizes in one or more different directions of coordinates, must have a number of work performing devices, in the present case in the form of transmissions, corresponding in number to these coordinates, and where each transmission must be associated with as many possibilities for shifting as there are sizes of blanks to be worked on.

For that reason it would be necessary, for example, in a machine for sewing stitch formations of a plurality of main sizes variable in the direction of one coordinate, each associated with a number of sub-sizes variable in the direction of a second coordinate, to provide two variable transmissions, one each for the main sizes and one each for the subsizes.

This situation arises, for example, with shoe machines which are to be suitable for sewing leather parts within a certain range of sizes, for example sizes 8 to 13, while taking into account the fact that a number of widths, for example four each, are associated with each size.

In such a machine, which is intended to serve for the automatic sewing of pieces of leather which are not previously arranged according to sizes, a control device would be needed which is actuated directly by the work blank and which passes on the operating impulses initiated by the blank in accordance with the size thereof to the transmissions for selecting the corresponding transmission ratio.

An automatic device suitable for forwarding the impulses received from the work blank to the coordinate size changing transmissions would require a plurality of electrical contacts, referred to hereinafter as operating switches, which is subdivided into a number of groups of switches corresponding to the number of the coordinate transmissions, which means that actuating of one operating switch of such a group selects the desired transmission speed of a coordinate block, and actuating of an operating switch of a further group selects the desired transmission speed of a further transmission block and that, if need be, dependent on or corresponding to the chosen gear set or transmission speed of the first block. This problem arises in the aforementioned shoe machines, because there, the widths must be adjusted or set depending on the particular size selected.

It is an object of the invention to provide a work blank support which makes possible the feeding of an automatic machine with different sewing material which is not preselected according to size and whereby the automatic machine is caused to initiate operation of the work performing devices in accordance with the factors by which they are controlled and which vary in accordance with the differences in the material or goods to be sewn.

In accordance with the invention this is accomplished by one or more shifting or switching elements on the material support which are adjustable in accordance with the factors that vary with the differences in the goods, which elements operate those actuating switches on the automatic machine that start the operation of the work performing devices associated with the factors of the pieces of material or goods in the material support.

In accordance with a further feature of the invention, the structural embodiment of the material support provides the combination of a support plate provided with cutouts and a clamping plate hingedly connected thereto and provided with registering cutouts which can be joined to the support plate with snap fastening means.

In order to provide for convenient setting of the switching elements to the particular sizes of the sewing material mounted in the support at any time, another feature in accordance with the invention provides for the setting of the switching elements to the factors of the sewing material by means of an appropriate number of setting levers linked to the clamping plate which at one end contact the sewing material and at the other end the switching elements or switch members.

It is, of course, also possible to manage without a contacting device and to provide instead a longitudinal slot in the clamping plate having a scale, whereby the size of the particular sewing material can be determined by relating the position of the outer edge of the material or goods to the scale and where subsequently the switch member is set in accordance with that figure.

Inasmuch as the setting levers are arranged upon the material support, it is necessary to plot on it fixed reference points so that the variation of the coordinates of the particular material placed on the support can be determined with respect to the coordinates of the material which was previously placed on the support. It is, therefore, another object of the invention to provide adjusting means on the support plate which serve for aligning or righting the sewing material.

As explained hereinabove, a plurality of widths is associated with each size or length of shoe leather parts, which results in that the widths must be adjusted in accordance with the setting of the sizes. In accordance with the invention this is accomplished by means of a pivotally supported setting lever on the clamping plate for the size or length, which in turn pivotally supports a second setting lever for the width.

In accordance with a further object of the invention the relationship between size and width can also be attained in that the feeler or follower lever for the size or length pivotally mounted on the clamping plate constitutes a coupling joint with the associated switching element and with a further arm linked to the clamping plate, which joint carries a pivotally supported second setting lever for the width.

An advantageous arrangement of the two independently adjustable switching elements for size and width results from the switching element of the lever scanning the size being slidable relative to the switching element of the lever scanning the width, on said lever. This provides the advantage that the operating switch groups and thus all operating switches can be arranged one besides the other, so that the clamping plate can contact the operating switches and register symmetrically with respect to the operating switch row. In this manner the possibility is provided to feed supporting plates or frames of different sizes to this operating switch row, to the extent that they can be processed in one machine, without it being necessary to make changes in the feeding devices or in the operating switch row.

Inasmuch as all sizes that occur are predetermined and the variation in the directions of the coordinates is at least 5 mm., it is advantageous to couple the setting levers with a catch arrangement so that the switch members can be set only within predetermined positions, which insures that in all cases the correct switches are actuated. This is accomplished in accordance with a further object of the invention in that each of the switching members has a number of teeth corresponding to the number of coordinated operating switches which, with the supporting frame in folded up condition, engage leaf springs on the support plate that serve as latches.

Advantageously the catch arrangement can simultaneously be utilized for returning the setting levers to their initial positions, i.e., the position corresponding to the largest size of a particular blank or pattern, as soon as the sewing material is removed from the material support upon completion of the sewing operation. In accordance with a further object of the invention this is accomplished in that the setting levers carried by the clamping plate are each combined with a biased draw spring secured to the clamping plate, so that both setting levers after withdrawal of the leaf springs from the catch teeth are automatically set to the greatest size to be scanned. It is, of course, also possible to replace the two springs which are arranged separately from one another by a single draw spring between the scanning lever mounted on the clamping plate and the arm of the coupling joint which supports the other scanning lever.

In order to protect the setting and the switching elements while stacking the material supports against outside effects, it is another object of the invention to provide spacing members upon the clamping plate which are suitably made of resilient material, such as rubber.

Figure 2:
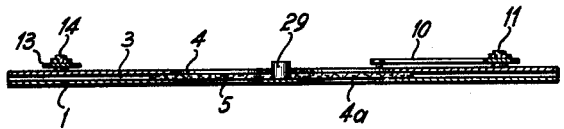

Other advantages and objects of the invention will become apparent from the following description with reference to the drawings which illustrate an embodiment of the work blank or sewing material support, and in which FIG. 1 shows the sewing material support in closed condition with sewing material mounted and with the operating or setting levers and the switching members each in a position corresponding to the size of the mounted sewing blank, and FIG. 2 shows a section through the material support taken along line II—II.

The material support as shown in FIG. 1 comprises a mounting or support plate 1 and a clamping plate 3 connected thereto by means of a hinge 2. The clamping plate is provided with cut-outs 4 within the confines of which a needle (not shown) moves up and down during operation of the machine for sewing the sewing material on work blanks 5. Alongside the cut-outs 4 two elongated apertures 6, 7 are located disposed substantially at an angle of 90° relative to one another into each of which projects an abutment member 8, 9, respectively, in the form of a pin or the like. The abutment member 9 is secured to a setting lever 10 in the form of an angular member which is pivotally movable about a stud 11 secured to clamping plate 3. The other end of angular lever 10 is linked to one end of a switching member 12 which is in the form of a sliding rail, to the other end of which a support lever arm 13 is linked which is pivotally mounted on a stud 14 secured to the clamping plate 3 at the same level as the stud 11.

Arm 13 has a stud 15 on which a further setting lever 16 is pivotally supported, one arm 16a of which has a stud 17 to which a link or arm 18 is connected on which the said abutment member 8 is mounted. Link or arm 18 is guided in a strip 19 secured to clamping plate 3. The other arm 16b of lever 16 is linked with its end to an actuating or switching member 20 which is likewise in the form of a sliding rail. The switching members 12 and 20 are each provided with a projecting wedge-shaped extension 12a, 20a, each of which, depending on its position, actuates an operating switch W, G, respectively, in the form of a pressure switch, having leads $W_1$, $G_1$ connected by way of relays (not shown) to the size changing transmissions of the machine.

Each of said switching members is provided with a recess 12b, 20b in the form of an elongated slot through each of which extend two guide pins 21, 22 secured to the clamping plate 3, of which the pins 22 extend through the switching member 20 as well as also through the switching member 12. Each of the switching members 12, 20 has a toothed rack 12c, 20c having a number of the teeth corresponding to the number of possible switching positions. Two leaf springs 23 extend through apertures 30 in the clamping plate 3 which springs are each secured to a block 24 mounted on the support plate 1. The leaf springs are so arranged as to height that they engage the teeth of racks 12c, 20c of the corresponding switching members with which they are associated. Each lever 10 and 16 is furthermore connected to the clamping plate 3 by means of a draw spring 25, 26. In order to provide for stacking of the sewing material supports the clamping plate is provided with yielding studs 27. The clamping plate 3 is connected with the support plate by means of snap fasteners 28. In addition to the blocks 24 and the halves of the snap fasteners which are not seen, the support plate 1 carries only adjusting bolts 29 which extend through two bores provided in the clamping plate 3.

As can be seen from FIG. 2 the support plate 1 has cut-outs 4a which register with the cut-outs 4 of the clamping plate 3 and between which the sewing material is clamped. This illustration shows also the abutting of the sewing material against the adjusting bolts 29.

The manner of operation of the device in accordance with the invention is as follows:

The seamstress places the sewing material supplied to her, which may be of any size, on the support plate 1. If, as in the case illustrated, rear portions of shoes are concerned, they are supplied in pairs and they are positioned in such a manner that recesses which were previously punched rest against the adjusting bolts 29. The clamping plate 3 is then placed over the support plate 1 and is by means of the snap fasteners 27 connected with the support plate 1 where the sewing material is held in its mounted position. The abutment bolts 8, 9 of the setting levers 10, 16 are then manually brought into engagement with the edges of the sewing material 5 whereby the shifting or switching members 12, 20 are displaced by proportionate amounts due to their pivoted connections with the setting levers 10, 16.

The sewing material supports thus prepared are now placed into a stacking shaft (not shown) and from there they drop onto a conveyor (not shown) in cadence with the rhythm of the work performed by the sewing machine. By means of this conveyor the sewing material supports are moved to the sewing machine, where they are seized or received by a device (not shown) and are moved in accordance with the selected coordinate size changing transmissions in the direction of sewing.

As already mentioned, the above example concerns a shoe machine which is provided for sewing the rear portions of shoes for six different sizes and while each size is associated with four different widths. The setting of the widths which depends on the sizes is effected by way of the coupling 10–12–13, because the lever 10 which sets the sizes can be adjusted independently, while lever 16 which sets the widths can only be set in dependency on the position of the setting lever 10. Accordingly, only six operating switches G are provided for initiating one of the six size changing transmissions, but nine operating switches W are provided for selecting the width changing transmissions, because due to the arrangement of the switches in a row relative to one G switch four W switches are required, for two G switches five W switches, etc., and finally for six G switches nine W switches are needed.

Having now described our invention with reference to the embodiment illustrated in the drawing, we do not wish to be limited thereto, but what we desire to protect by Letters Patent of the United States of America is set forth in the appended claims.

We claim:

1. Work blank support for securing blanks of material which may vary as to size, width and other physical characteristics that determine the working operations to be performed on the blanks, said support being adapted for use with automatic machines equipped with work performing devices and having operating switches adapted to actuate said work performing devices, said support comprising means for mounting said blanks with said means being mounted to cooperate with said operating switches wherein said support and said operating switches are adapted to be in operating relationship to said work performing devices, said support having switching members mounted thereon operative to actuate different said operating switches, means for adjusting said switching members to correspond to different said physical characteristics of said blanks and operative to actuate different said operating switches corresponding to said different said physical characteristics thereby adapting corresponding work performing devices to effect operations on said blanks.

2. Work blank support for securing blanks of material which may vary as to size, width and other physical characteristics that determine the working operations to be performed on the blanks, said support being adapted for use with automatic machines equipped with work performing devices and having operating switches adapted to actuate said work performing devices, said support comprising means for mounting said blanks with said means being mounted to cooperate with said operating switches wherein said support and said operating switches are adapted to be in operating relationship to said work performing devices, said support having switching members mounted thereon operative to actuate different said operating switches, means for adjusting said switching members to correspond to different said physical characteristics of said blanks and operative to actuate different said operating switches corresponding to said different said physical characteristics thereby adapting corresponding work performing devices to effect operations on said blanks, said support comprising a base plate provided with cut-outs, a clamping plate having corresponding registering cut-outs, hinge means connecting said plates and snap fastener means comprising members on both said plates for joining said plates.

3. Work blank support for securing blanks of material which may vary as to size, width and other physical characteristics that determine the working operations to be performed on the blanks, said support being adapted for use with automatic machines equipped with work performing devices and having operating switches adapted to actuate said work performing devices, said support comprising means for mounting said blanks with said means being mounted to cooperate with said operating switches wherein said support and said operating switches are adapted to be in operating relationship to said work performing devices, said support having switching members mounted thereon operative to actuate different said operating switches, said switching members being adjustable to correspond to different said physical characteristics of said blanks and operative to actuate different said operating switches corresponding to said different said physical characteristics thereby adapting corresponding work performing devices to effect operations on said blanks, said support comprising a base plate provided with cut-outs, a clamping plate having corresponding registering cut-outs, hinge means connecting said plates and snap fastener means comprising members on both said plates for joining said plates, and setting lever means pivotally supported on said clamping plate and corresponding in number to said switching members, each having one arm linked to one of said switching members and another arm adapted to scan the material on said support.

4. Work blank support for securing blanks of material which may vary as to size, width and other physical characteristics that determine the working operations to be performed on the blanks, said support being adapted for use with automatic machines equipped with work performing devices and having operating switches adapted to actuate said work performing devices, said support comprising means for mounting said blanks with said means being mounted to cooperate with said operating switches wherein said support and said operating switches are adapted to be in operating relationship to said work performing devices, said support having switching members mounted thereon operative to actuate different said operating switches, means for adjusting said switching members to correspond to different said physical characteristics of said blanks and operative to actuate different said operating switches corresponding to said different said physical characteristics thereby adapting corresponding work performing devices to effect operations on said blanks, said support comprising a base plate provided with cut-outs, a clamping plate having corresponding registering cut-outs, hinge means connecting said plates and snap fastener means comprising members on both said plates for joining said plates and said base plate being provided with righting means for the material mounted thereon.

5. Work blank support for securing blanks of material which may vary as to size, width and other physical characteristics that determine the working operations to be performed on the blanks, said support being adapted for use with automatic machines equipped with work performing devices and having operating switches adapted to actuate said work performing devices, said support comprising means for mounting said blanks with said means being mounted to cooperate with said operating switches wherein said support and said operating switches are adapted to be in operating relationship to said work performing devices, said support having switching members mounted thereon operative to actuate different said operating switches, said switching members being adjustable to correspond to different said physical characteristics of said blanks and operative to actuate different said operating switches corresponding to said different said physical characteristics thereby adapting corresponding work performing devices to effect operations on said blanks, said support comprising a base plate provided with cut-outs, a clamping plate having corresponding registering cut-outs, hinge means connecting said plates and snap fastener means comprising members on both said plates for joining said plates, and setting lever means pivotally supported on said clamping plate and corresponding in number to said switching members, each having one arm linked to one of said switching members and another arm adapted to scan the material on said support, and one said setting lever means being pivotally supported on and connected to a support lever arm pivotally mounted on said clamping plate.

6. Work blank support for securing blanks of material which may vary as to size, width and other physical characteristics that determine the working operations to be performed on the blanks, said support being adapted for use with automatic machines equipped with work performing devices and having operating switches adapted to actuate said work performing devices, said support comprising means for mounting said blanks with said means being mounted to cooperate with said operating switches wherein said support and said operating switches are adapted to be in operating relationship to said work performing devices, said support having switching members mounted thereon operative to actuate different said operating switches, said switching members being adjustable to correspond to different said physical characteristics of said blanks and operative to actuate different said operating switches corresponding to said different said physical characteristics thereby adapting corresponding work performing devices to effect operations on said blanks, said support comprising a base plate provided with cut-outs, a clamping plate having corresponding registering cut-outs, hinge means connecting said plates and snap fastener means comprising members on both said plates for joining said plates, and setting lever means pivotally supported on said clamping plate and corresponding in number to said switching members, each having one arm linked to one of said switching members and another arm adapted to scan the material on said support, and one said setting lever means being pivotally supported on and connected to a support lever arm pivotally mounted on said clamping plate, the other said setting lever means and the switching member linked thereto constituting a coupling joint with said support lever arm which supports said one setting lever.

7. Work blank support for securing blanks of material which may vary as to size, width and other physical characteristics that determine the working operations to be performed on the blanks, said support being adapted for use with automatic machines equipped with work performing devices and having operating switches adapted to actuate said work performing devices, said support comprising means for mounting said blanks with said means being mounted to cooperate with said operating switches wherein said support and said operating switches are adapted to be in operating relationship to said work performing devices, said support having switching members mounted thereon operative to actuate different said operating switches, said switching members being adjustable to correspond to different said physical characteristics of said blanks and operative to actuate different said operating switches corresponding to said different said physical characteristics thereby adapting corresponding work performing devices to effect operations on said blanks, said support comprising a base plate provided with cut-outs, a clamping plate having corresponding registering cut-outs, hinge means connecting said plates and snap fastener means comprising members on both said plates for joining said plates, and setting lever means pivotally supported on said clamping plate and corresponding in number to said switching members, each having one arm linked to one of said switching members and another arm adapted to scan the material on said support, and one said setting lever means being pivotally supported on and connected to a support lever arm pivotally mounted on said clamping plate, the other said setting lever means and the switching member linked thereto constituting a coupling joint with said support lever arm which supports said one setting lever, and said switching member linked with said one setting lever means being slidable relative to the said switch member associated with said other setting lever means.

8. Work blank support for securing blanks of material which may vary as to size, width and other physical characteristics that determine the working operations to be performed on the blanks, said support being adapted for use with automatic machines equipped with work performing devices and having operating switches adapted to actuate said work performing devices, said support comprising means for mounting said blanks with said means being mounted to cooperate with said operating switches wherein said support and said operating switches are adapted to be in operating relationship to said work performing devices, said support having switching members mounted thereon operative to actuate different said operating switches, said switching members being adjustable to correspond to different said physical characteristics of said blanks and operative to actuate different said operating switches corresponding to said different said physical characteristics thereby adapting corresponding work performing devices to effect operations on said blanks, said support comprising a base plate provided with cut-outs, a clamping plate having corresponding registering cut-outs, hinge means connecting said plates and snap fastener means comprising members on both said plates for joining said plates, and setting lever means pivotally supported on said clamping plate and correponding in number to said switching members, each having one arm linked to one of said switching members and another arm adapted to scan the material on said support, and one said setting lever means being pivotally supported on and connected to a support lever arm pivotally mounted on said clamping plate, the other said setting lever means and the switching member linked thereto constituting a coupling joint with said support lever arm which supports said one setting lever, and said switching member linked with said one setting lever means being slidable relative to the said switching member associated with said other setting lever means, each of said switching members having a tooth rack presenting a plurality of teeth corresponding in number to the operating switch with which they are associated, and leaf springs being provided on said base plate, one each adjacent one of said tooth racks, said leaf springs engaging said tooth racks in the manner of latches.

9. Work blank support in accordance with claim 8 wherein each said setting lever means includes a spring biasing said setting lever means in the direction for adjustment to the largest size to be scanned.

10. Work blank support for securing blanks of material which may vary as to size, width and other physical characteristics that determine the working operations to be performed on the blanks, said support being adapted for use with automatic machines equipped with work performing devices and having operating switches adapted to actuate said work performing devices, said support comprising means for mounting said blanks with said means being mounted to cooperate with said operating switches wherein said support and said operating switches are adapted to be in operating relationship to said work performing devices, said support having switching members mounted thereon operative to actuate different said operating switches, means for adjusting said switching members to correspond to different said physical charcteristics of said blanks and operative to actuate different said operating switches corresponding to said different said physical characteristics thereby adapting corresponding work performing devices to effect operations on said blanks, said support comprising a base plate provided with cut-outs, a clamping plate having corresponding registering cut-outs, hinge means connecting said plates, snap fastener means comprising members on both said plates for joining said plates, and spacing members provided on said clamping palte.

11. Work blank support for securing blanks of material which may vary as to size, width and other physical characteristics that determine the working operations to be performed on the blanks, said support being adapted for use with automatic machines equipped with work performing devices and having operating switches adapted to actuate said work performing devices, said support comprising means for mounting said blanks with said means being mounted to cooperate with said operating switches wherein said support and said operating switches are adapted to be in operating relationship to said work performing devices, said support having switching members mounted thereon operative to actuate different said operating switches, said switching members being adjustable to correspond to different said physical characteristics of said blanks and operative to actuate different said operating switches corresponding to said different said physical characteristics thereby adapting corresponding work performing devices to effect operations on said blanks, said switching members including setting lever means pivotally supported on said support and corresponding in number to said switching members, each having one arm linked to one of said switching members and another arm adapted to scan the material on said support.

References Cited in the file of this patent

UNITED STATES PATENTS

| | | |
|---|---|---|
| 2,876,650 | Sangster | Mar. 10, 1959 |
| 2,899,919 | Myska | Aug. 18, 1959 |
| 3,072,081 | Milligan et al. | Jan. 8, 1963 |